US010698190B2

(12) United States Patent
Abbott et al.

(10) Patent No.: US 10,698,190 B2
(45) Date of Patent: Jun. 30, 2020

(54) COMPACT OPTICAL SYSTEM FOR SUBSTANIALLY SIMULTANEOUS MONITORING OF SAMPLES IN A SAMPLE ARRAY

(71) Applicant: BioFire Defense, LLC, Salt Lake City, UT (US)

(72) Inventors: Richard David Abbott, Draper, UT (US); Patrick L. Riley, Salt Lake City, UT (US); Zackery Kent Evans, Woods Cross, UT (US); Lyle M. Nay, Park City, UT (US)

(73) Assignee: BioFire Defense, LLC, Salt Lake City, UT (US)

( * ) Notice: Subject to any disclaimer, the term of this patent is extended or adjusted under 35 U.S.C. 154(b) by 94 days.

(21) Appl. No.: 15/920,691

(22) Filed: Mar. 14, 2018

(65) Prior Publication Data

US 2018/0203216 A1   Jul. 19, 2018

Related U.S. Application Data

(63) Continuation of application No. 13/834,056, filed on Mar. 15, 2013.

(51) Int. Cl.
*B01L 7/00* (2006.01)
*G02B 17/06* (2006.01)
(Continued)

(52) U.S. Cl.
CPC ............... *G02B 17/06* (2013.01); *B01L 7/52* (2013.01); *G02B 13/22* (2013.01); *G02B 25/007* (2013.01); *G02B 27/0025* (2013.01); *B01L 2300/0654* (2013.01); *B01L 2300/0829* (2013.01); *B01L 2300/1816* (2013.01); *B01L 2300/1822* (2013.01); *B01L 2300/1827* (2013.01);
(Continued)

(58) Field of Classification Search
CPC ..... B01L 2300/0829; B01L 2300/1844; B01L 2300/1861; B01L 2300/1827; B01L 2300/1822; B01L 2300/1816; B01L 2300/0654; G02B 13/22; G02B 17/06; G02B 21/34; G02B 27/007; G02B 27/0025
USPC ................................ 435/286.1, 287.2, 289.1
See application file for complete search history.

(56) References Cited

U.S. PATENT DOCUMENTS 3,927,944 A   12/1975   Iwashashi et al.
5,567,294 A   10/1996   Dovichi et al.
(Continued)

FOREIGN PATENT DOCUMENTS

DE   3147433 A1   6/1983
EP   1750115 A1   2/2007
(Continued)

OTHER PUBLICATIONS

Supplemental European Search Report issued in EP 14767665 dated Oct. 6, 2016.
(Continued)

*Primary Examiner* — Liban M Hassan
(74) *Attorney, Agent, or Firm* — Barnes & Thornburg LLP

(57) ABSTRACT

Optical systems and apparatuses configured for enabling substantially simultaneous observation of a plurality of points in an array from a common reference point. Without the optical systems and apparatuses disclosed herein, less
(Continued)

than all of the plurality of points can be observed substantially simultaneously from the common reference point.

19 Claims, 13 Drawing Sheets

(51) Int. Cl.
*G02B 25/00* (2006.01)
*G02B 27/00* (2006.01)
*G02B 13/22* (2006.01)
*G02B 21/34* (2006.01)

(52) U.S. Cl.
CPC ............... *B01L 2300/1844* (2013.01); *B01L 2300/1861* (2013.01); *G02B 21/34* (2013.01)

(56) References Cited

U.S. PATENT DOCUMENTS

| | | | |
|---|---|---|---|
| 5,596,989 A | 1/1997 | Morita | |
| 5,721,435 A | 2/1998 | Troll | |
| 5,724,189 A | 3/1998 | Ferrante | |
| 5,856,888 A | 1/1999 | Ross et al. | |
| 6,197,572 B1 | 3/2001 | Schneebeli | |
| 6,337,435 B1 | 1/2002 | Chu et al. | |
| 6,377,346 B1 | 4/2002 | Vaisala et al. | |
| 7,532,649 B1 | 5/2009 | Szarmes | |
| 7,628,958 B2 | 12/2009 | Tamaoki et al. | |
| 7,670,832 B2 | 3/2010 | Wittwer et al. | |
| 7,760,361 B2 | 7/2010 | Furusawa | |
| 7,869,042 B2 | 1/2011 | Aasmul | |
| 9,383,323 B2 | 7/2016 | Meloni | |
| 2002/0080357 A1 | 6/2002 | Dana | |
| 2007/0002434 A1 | 1/2007 | Juskaitis | |
| 2008/0003588 A1 | 1/2008 | Hasson et al. | |
| 2008/0138887 A2 | 6/2008 | Atwood et al. | |
| 2010/0019157 A1 | 1/2010 | Furlan | |
| 2010/0055770 A1 | 3/2010 | Kopp | |
| 2010/0067004 A1 | 3/2010 | Nagashima | |
| 2010/0081191 A1 | 4/2010 | Woods | |
| 2010/0227386 A1 | 9/2010 | Neuzil et al. | |
| 2012/0025097 A1 | 2/2012 | Meloni | |
| 2012/0045756 A1 | 2/2012 | Rothmann et al. | |

FOREIGN PATENT DOCUMENTS

| | | |
|---|---|---|
| JP | 2008310359 A | 12/2008 |
| WO | 2010110096 A1 | 9/2010 |
| WO | 2012075360 A1 | 6/2012 |
| WO | 2014149875 A2 | 9/2014 |

OTHER PUBLICATIONS

Search Report and Written Opinion for Application No. 11201507553T dated Apr. 29, 2016.
Pruss et al., "Testing Aspheres", Optic and Photonics News, Apr. 2008, pp. 24-29.
International Search Report and Written Opinion for PCT/US2014/021317, completed Oct. 18, 2014, dated Nov. 4, 2014, 11 pages.

COMPACT OPTICAL SYSTEM FOR SUBSTANIALLY SIMULTANEOUS MONITORING OF SAMPLES IN A SAMPLE ARRAY

CROSS REFERENCE TO RELATED APPLICATIONS

This application is a continuation of U.S. patent application Ser. No. 13/834,056, filed Mar. 15, 2013, and is expressly incorporated herein by reference.

BACKGROUND

The growth of biological research has resulted in a number of assay techniques such as reporter gene assays, new pharmaceutical compound screening, high-throughput polymerase chain reaction ("PCR"), real-time PCR, and similar assays, and has created a need for handling large numbers of test samples at one time in order to control costs and efficiently handle these large numbers of samples. A number of analytical methods are now available for high-throughput screening of these samples. One important method for monitoring samples in high-throughput setting is the use of luminescence from fluorescent dyes and the like. Such substances can be used as a tag, reporter, or marker for various test assays where luminescence can be used as a direct or indirect measure of a selected property in a sample well.

In a high-throughput or real-time assay, large numbers of samples are typically processed and analyzed together (e.g., by luminescence emission) in a multi-well sample plate called an assay microplate. These microplates provide an array of wells, usually 48 or 96 wells in typical examples, but 384 well and 1536 well microplates are becoming more common as well. The most common configuration at this time is the 96-well format (in an 8 by 12 configuration). Illustratively, all plates, regardless of the number of wells, can have roughly the same dimensions. It is also possible to have plates of other configurations and dimensions.

In many assays, assay microplate wells are filled with test samples and then placed in an instrument that may include a detector system, such as a luminescence microplate reader for measuring the relative luminescence emissions of each test well. Since different luminescence materials used for microplates assays produce different degrees of light intensity, light intensity can act as a direct or indirect measure of test results—i.e., the greater the light intensity, the greater the result. For example, some PCR thermocyclers include optical systems for real-time monitoring of luminescence emission of samples undergoing thermocycling for nucleic acid amplification or for post-amplification melting. In such systems, fluorescent emission of one or more reagents included in the sample(s) can be used to monitor things such as template concentration, product concentration, DNA melting point temperature, and the like.

Although luminescence microplates and luminescence microplate readers and similar instruments are of great utility in automated screening, there are a number of issues that affect their use. In particular, unless an optical device (e.g., a digital or analog camera or another detector) is moved sufficiently far from the microplate, the optical device cannot typically see to the bottom of all of the wells simultaneously. This is illustrated in FIG. 1, which shows a view of a 96-well plate 100 from a relatively close distance. As can be seen in FIG. 1, a camera or another type of detector can see all the way to the bottom of the wells only in the center of the plate in the region labeled 110. However, because of obstruction from the walls of the wells, the camera cannot see into the bottom of the wells in the region outside region 110. This is illustrated, for example, at wells 120a and 120b. A number of systems have been developed to allow microplate readers and similar instruments to see into all of the wells of a microplate.

In one example, the detector (e.g., an optical device, such as a digital camera) can be moved far enough from the microplate to allow the detector to see to the bottom of all of the wells. However, moving the optical device sufficiently far from the microplate increases the form factor of the plate reader and typically makes the plate reader large and cumbersome. Likewise, arbitrarily increasing the distance between the optical device and the microplate leads to diffusion of light and loss of signal from the microplate and can also lead to cross talk between signals from adjacent samples wells.

In another example, a luminescence microplate reader may have a series of optical devices wherein each device is positioned to correspond to a well in the microplate that holds a test sample. The optical device is often a photodiode.

In yet another example, the luminescence microplate reader may be fitted with a single optical device wherein the plate, the reading device, or both are moved sequentially to the appropriate reading position in order to detect the luminescence in each well. Alignment can be adversely affected when one or more of the aligned components involved is shifted in position or becomes damaged. If, for any reason, the alignment is incorrect, the wells will not be centered properly in alignment with the optical reading device, resulting in an incorrect luminescence measurement In still yet another example, the luminescence microplate reader may be fitted with a single optical device and one or more optical lenses that focus the signal from the wells onto the optical device. However, such optical lens systems can be expensive and cumbersome. Moreover, the optics used to measure luminescence must avoid cross-talk from one sample well when measuring the luminescence from an adjacent well.

BRIEF SUMMARY

This disclosure relates generally to optical systems and apparatuses configured for enabling substantially simultaneous observation and monitoring of a plurality of points of interest in an array from a common reference point. For example, a plurality of points in an array may include the sample wells in a 96-well plate. According to one embodiment of the present disclosure, less than all of the plurality of points can be observed substantially simultaneously from the common reference point without optical systems and apparatuses such as those disclosed herein.

In an embodiment, an optical system that defines an optical path is disclosed. The optical system includes a body included as an element in the optical path that includes a plurality of points of interest, and means disposed in the optical path for enabling observation of each of the plurality of points of interest substantially simultaneously. Suitable examples of means disposed in the optical path for enabling observation of each of the plurality of points of interest substantially simultaneously include, but are not limited to, a mirror having a compound curvature, a sample block having a single axis of curvature paired with a mirror having a single axis of curvature that is complementary to the sample block, and a sample block having a compound curvature. However, it is noted that the means disposed in the optical path is other than a focusing lens.

In one aspect, the means disposed in the optical path is positioned and configured such that the means provides a substantially unimpeded view of each of the points of interest substantially simultaneously. In another aspect, the means disposed in the optical path is configured such that the means defines a ray length from each point of interest to a common reference point whose distance from the plurality of points of interest is less than or equal to a predetermined distance. In yet another aspect, each of the ray lengths from each point of interest to the common reference point are substantially equal in length and they have paths that are substantially parallel to one other for at least a portion of the path.

In another embodiment, an apparatus is disclosed. The apparatus may include a thermocycling system configured for subjecting a plurality of biological samples contained within a corresponding plurality of sample containers to thermal cycling, and an optical system defining an optical path that is operatively associated with the thermocycling system. The optical system may be configured and arranged for substantially simultaneous monitoring of fluorescence in each of the plurality of biological samples.

In one embodiment, the optical system may include a sample block that is an element of the optical path, the sample block including a top surface and a plurality of sample wells defining a plurality of recessed bottom surfaces, and one or more elements that collectively define one or more curved surfaces that are disposed in the optical path. Suitable examples of the one or more curved surfaces include, but are not limited to, a mirror having a compound curvature, a sample block having a single axis of curvature paired with a mirror having a single axis of curvature that is complementary to the sample block, and a sample block having a compound curvature. The one or more curved surfaces are configured such that they collectively define a ray length from each point of interest to a common reference point whose distance from the points of interest is less than or equal to a predetermined distance. The ray lengths defined by the one or more curved surfaces may be substantially the same.

In one embodiment, the sample block may include a top surface and a plurality of sample receptacles defining a plurality of recessed bottom surfaces, wherein the plurality of recessed bottom surfaces define a first plurality of points of interest. In another embodiment, each of the plurality of sample receptacles of the sample block are configured to interface with a plurality of sample tubes or a multi-well well plate. The sample tubes include an exterior surface, and interior surface, and a plurality of recessed interior bottom surfaces that define a second plurality of points of interest. The one or more curved surfaces may be configured and arranged such that the ray lengths from the second plurality of points of interest to the common reference point may be substantially the same.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

I. Introduction and Definitions

Figure 1:
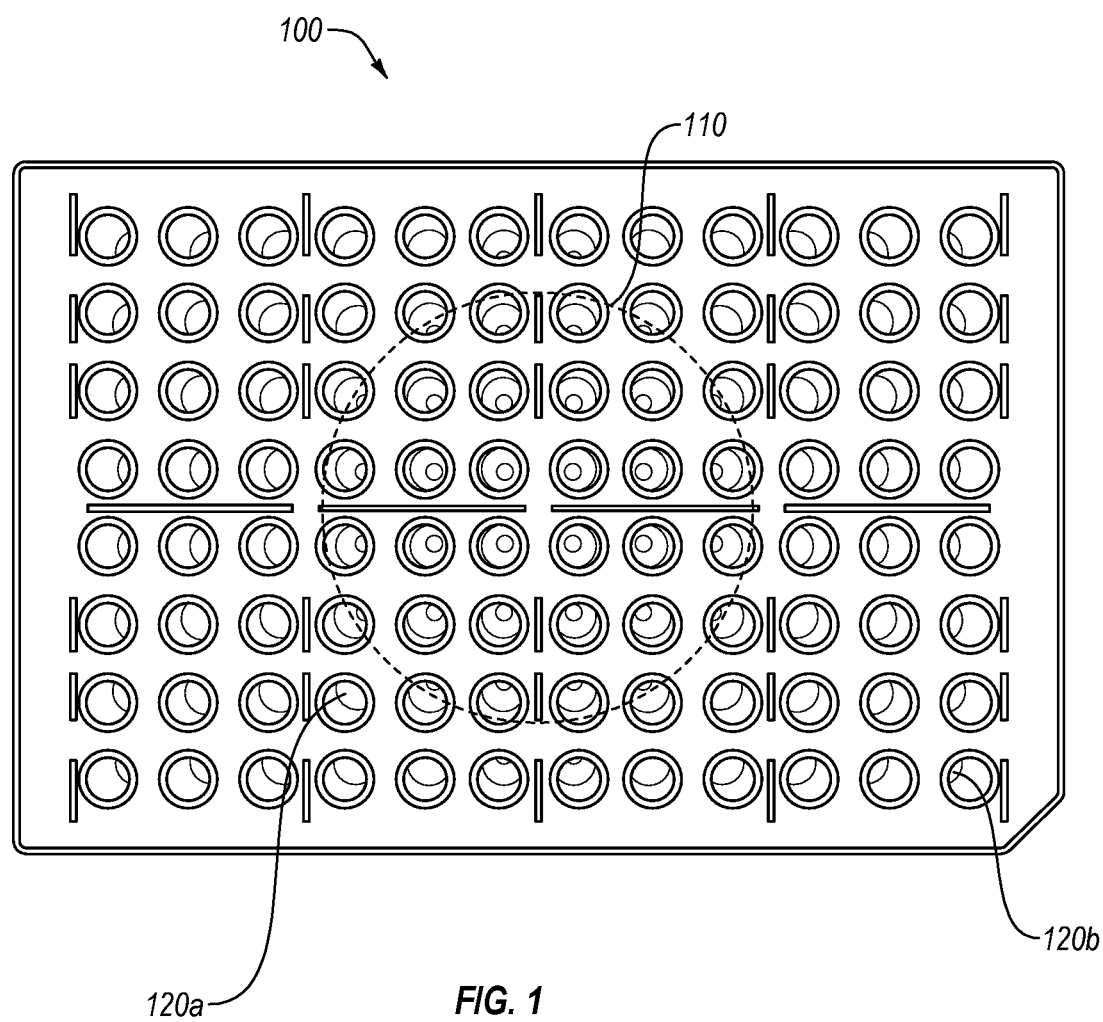
FIG. 1 illustrates a 96-well plate.

This disclosure relates generally to optical systems and apparatuses configured for enabling substantially simultaneous observation and monitoring of a plurality of points of interest in an array from a common reference point. For example, a plurality of points in an array may include the sample wells in a 96-well plate. According to one embodiment of the present disclosure, less than all of the plurality of points can be observed substantially simultaneously from the common reference point without the optical systems and apparatuses disclosed herein.

In one embodiment, the present invention may be directed to an optical system that is used to collect emitted fluorescence data from samples being excited by one of multiple possible excitation sources. For example, the optical systems and apparatuses described herein may be used for real-time monitoring (e.g., monitoring) of biological samples undergoing a polymerase chain reaction (PCR) or a similar nucleic acid amplification technique. Data are captured using a camera-based acquisition system focusing on samples in a sample plate (e.g., a 96-well sample plate) that is seated a fixed distance from the camera (e.g., in a sample block of the PCR thermocycler).

While the present disclosure generally discusses fluorescent monitoring of a PCR reaction as an example where the optical systems and apparatuses may be used, this is not intended to be limiting. The optical systems and apparatuses described herein are capable of collecting data from or monitoring essentially any optically detected assay, test, or the like that is performed in a multi-well plate format, or provided in another planar array format. For example, the optical systems and apparatuses described herein may be used for monitoring assays such as, but not limited to, reporter assays with an optical readout (e.g., fluorescent assays), protein melting assays, nucleic acid melting assays, direct fluorescent antibody assays, turbidimetric assays, and the like.

One limitation of collecting data from a standard well plate results from the geometry of the plate itself. That is, the well plate includes a relatively small sample at the bottom of a relatively tall narrow sample well. In order for a camera (e.g., a digital or analog camera) or another imaging device to be able to image the bottom of every well in a standard 96-well plate substantially simultaneously without having the top or the walls of the peripheral wells partially eclipse the actual sample, the imaging system illustratively could include additional optics (e.g., one or more optical lenses that focus the signal from the wells onto the camera), or the camera could be placed approximately 17 to 18 inches or more above the top of the plate. As discussed in the Background section, lensing systems add to the expense and complexity of an instrument and moving the camera sufficiently far from the instrument adversely affects the size of the instrument. In order to dispense with complicated and expensive focusing optics while shrinking the form factor of the instrument, it is desirable to develop alternative methods of data acquisition that are low profile yet do not experience any sample eclipsing.

Before the optical systems and apparatuses are disclosed and described, it is to be understood that this invention is not limited to the particular configurations and materials disclosed herein as such configurations materials may vary somewhat. It is also to be understood that the terminology employed herein is used for the purpose of describing particular embodiments only and is not intended to be limiting, since the scope of the present invention will be limited only by the appended claims and equivalents thereof.

It must be noted that, as used in this specification and the appended claims, the singular forms "a," "an," and "the" include plural referents unless the context clearly dictates otherwise.

In describing and claiming the present invention, the following terminology will be used in accordance with the definitions set out below.

As used herein, the terms "polymerase chain reaction" and "PCR" refer to a technique used in molecular biology for amplification of a nucleic acid template. PCR derives its name from one of its key components, a DNA polymerase used to amplify a piece of DNA by cyclic in vitro enzymatic replication. Typically, PCR employs a thermostable polymerase, deoxynucleotide triphosphates ("dNTPs"), a pair of primers, and a template DNA. A single PCR reaction (or cycle) often involves (1) increasing the sample temperature sufficient to melt or denature a double-stranded DNA molecule into single-stranded templates, (2) cooling the sample to allow a DNA primer to bind or anneal to each template, and optionally (3) re-adjusting the sample temperature to optimize the enzymatic addition of dNTPs onto a terminus of each bound primer to form a new DNA molecule. As PCR progresses, the generated DNA (the "amplicon") is itself used as a template for further replication. This sets in motion a chain reaction in which the DNA template is exponentially amplified. With PCR, it is possible to amplify a single or few copies of a DNA across several orders of magnitude, generating millions or more copies of the DNA.

While PCR is the amplification method used in the examples herein, it is understood that other amplification methods are contemplated, such as strand displacement amplification (SDA); nucleic acid sequence-based amplification (NASBA); cascade rolling circle amplification (CRCA), loop mediated isothermal amplification of DNA (LAMP); isothermal and chimeric primer-initiated amplification of nucleic acids (ICAN); target based-helicase dependant amplification (HDA); transcription-mediated amplification (TMA), and the like. Therefore, when the term PCR is used, it should be understood to include other alternative amplification methods.

As used herein, the terms "nucleic acid," "DNA," "RNA," and similar terms also include nucleic acid analogs, i.e., analogs having other than a phosphodiester backbone. For example, the so-called "peptide nucleic acids," which are known in the art and have peptide bonds instead of phosphodiester bonds in the backbone, are considered within the scope of the present invention.

As used herein, the terms "fluorescent monitoring," "continuous monitoring," and similar terms refer to monitoring techniques for monitoring a PCR reaction in real time either through the intrinsic fluorescence of nucleic acids or though dyes or probes that may be included in a PCR reaction. For instance, continuous monitoring may involve monitoring the emission properties of a PCR reaction multiple times during a cycle of PCR, during temperature transitions or holds, and more preferably obtaining at least one data point in each temperature transition or hold.

As used herein, term "cycle-by-cycle" monitoring means monitoring the PCR reaction once each cycle, illustratively during the annealing phase of PCR. As used herein, the terms "fluorescence resonance energy transfer relationship," "FRET," and similar terms refer to energy transfer between two fluorophores that are in close physical proximity. The fluorophores may include a donor and quencher, such as in TaqMan-type probes, or may include a donor and acceptor wherein the emission spectrum of one fluorophore overlaps the excitation spectrum of the other. One such configuration involves adjacent hybridization of an oligonucleotide labeled with a donor fluorophore and another oligonucleotide labeled with an acceptor fluorophore to a target nucleic acid such that the donor fluorophore can transfer resonance energy to the acceptor fluorophore such that the acceptor fluorophore produces a measurable fluorescence emission.

As used herein, "double stranded nucleic acid-specific dyes" or "dsDNA-binding dyes" includes any substance that is capable of being detected when in the presence of, preferably complexed with, a double stranded nucleic acid. Typically, a dsDNA-binding dye will preferentially bind or complex with double stranded nucleic acid. Illustratively, the dsDNA-binding dye is a fluorescent dye, and its fluorescent characteristics when complexed with the double stranded nucleic acid is distinguishable from when it is not so complexed. Typically, a dsDNA-binding dye will produce a stronger (larger) fluorescent signal (fluorescent emission) when complexed with the double stranded nucleic acid than when it is not. However, such dyes may produce a weaker (smaller) fluorescent signal when bound to double stranded nucleic acid, or they may produce a different fluorescent signal, such a signal at a different wave length. Any such differentiable signal is useful in the present invention.

Dyes useful in the methods disclosed herein include, but are not limited to, SYBR® Green I, SYBR® Gold, ethidium bromide, acridine orange, propidium bromide, PicoGreen®, Hoechst 33258, Hoechst 33342, Hoechst 34580, YO-PRO®-1, YOYO®-1, LC640, LC705, and LCGreen®. However, other dsDNA-binding dyes are known in the art and are included in the scope of this invention.

Other fluorescent detection means are known in the art. It is understood that FRET and dsDNA-binding dyes are meant to be illustrative only.

PCR requires repetitive template denaturation and primer annealing. These hybridization transitions are temperature-dependent. The temperature cycles of PCR that drive amplification alternately denature accumulating product at a high temperature and anneal primers to the product at a lower temperature. The transition temperatures of product denaturation and primer annealing depend primarily on GC content and length. If a probe is designed to hybridize internally to the PCR product, the melting temperature of the probe also depends on GC content, length, and degree of complementarity to the target. Fluorescence probes and dsDNA binding dyes compatible with PCR can monitor hybridization during amplification and can be used in post-PCR melting analysis.

II. Optical Systems and Apparatuses

Figure 2A:
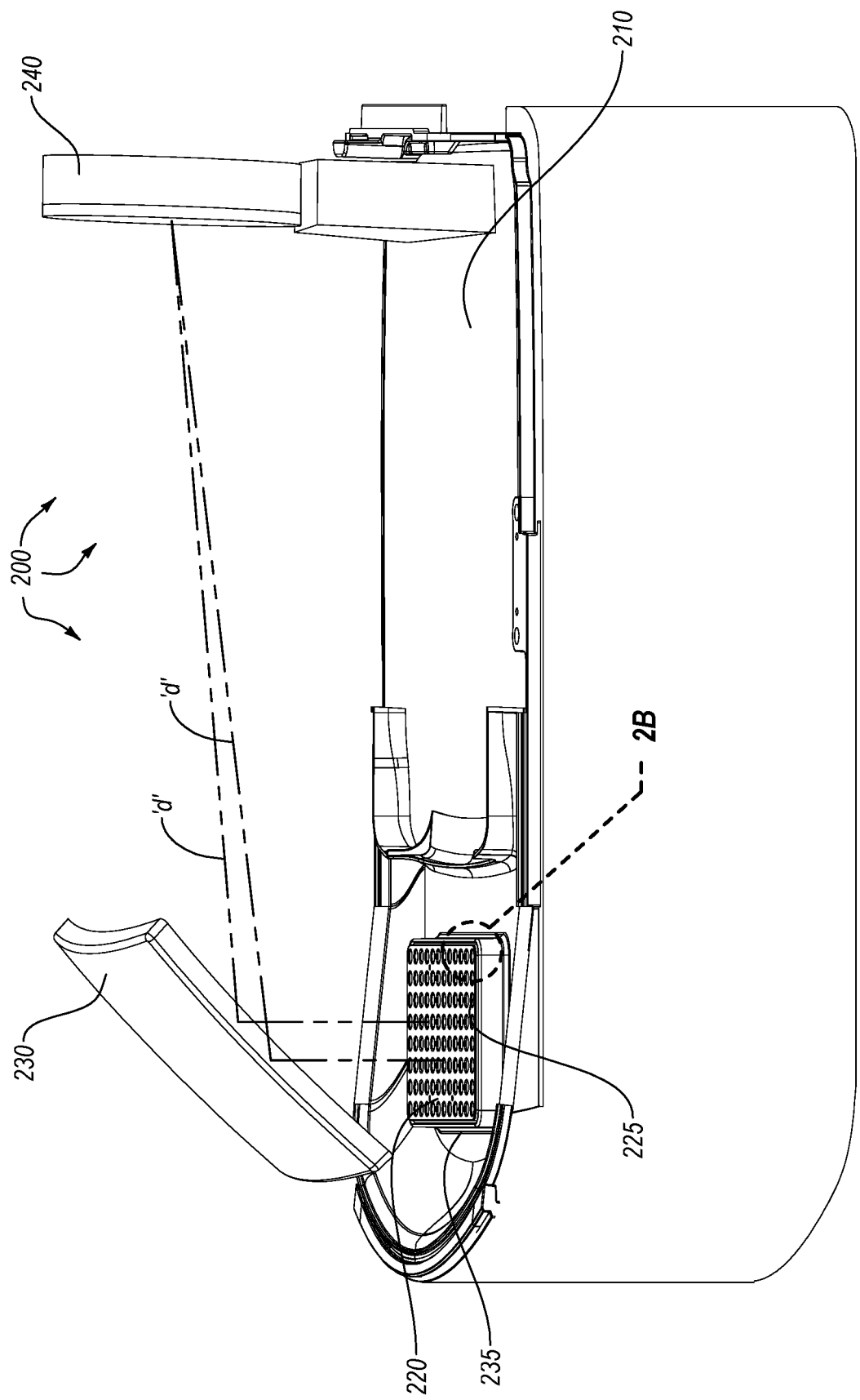
FIG. 2A illustrates an optical system that may be used for substantially simultaneous observation of an array of points of interest.

Referring now to FIG. 2A, one example of an optical system 200 that may be used for substantially simultaneous observation of points of interest in an array is illustrated. The optical system 200 includes a body 210, a sample block 220 having a number of recessed receptacles 225, and an observation apparatus 240 (e.g., a camera). In the illustrated embodiment, a mirror 230 or a similar reflective element is interposed between the sample block 220 and the observation apparatus 240. In the illustrated embodiment, the mirror 230, the sample block 220, and the means for observing 240 are cooperatively positioned relative to each other such that the observation apparatus 240 is capable of substantially simultaneous observation/monitoring of the contents and/or a state of each of the recessed receptacles 225.

Figure 2B:
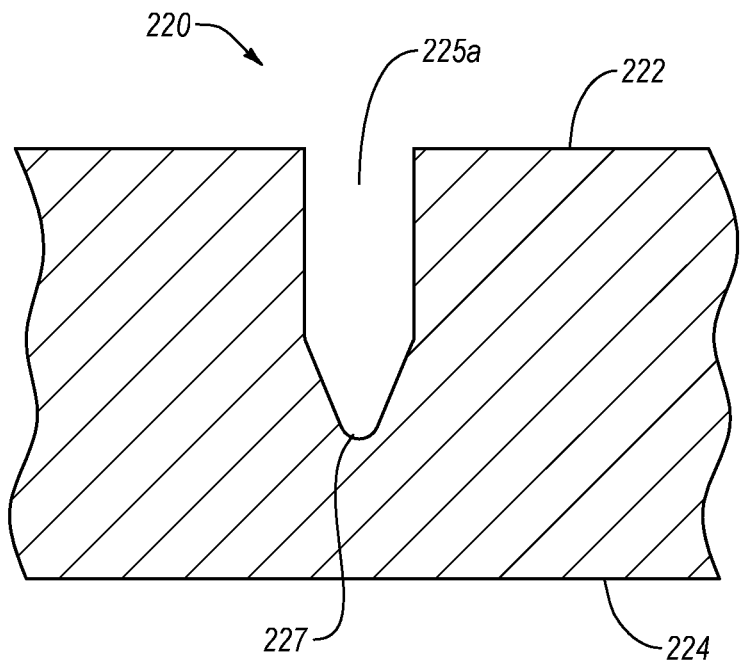
FIG. 2B illustrates a single sample receptacle of the sample block of FIG. 2A.
Figure 2C:
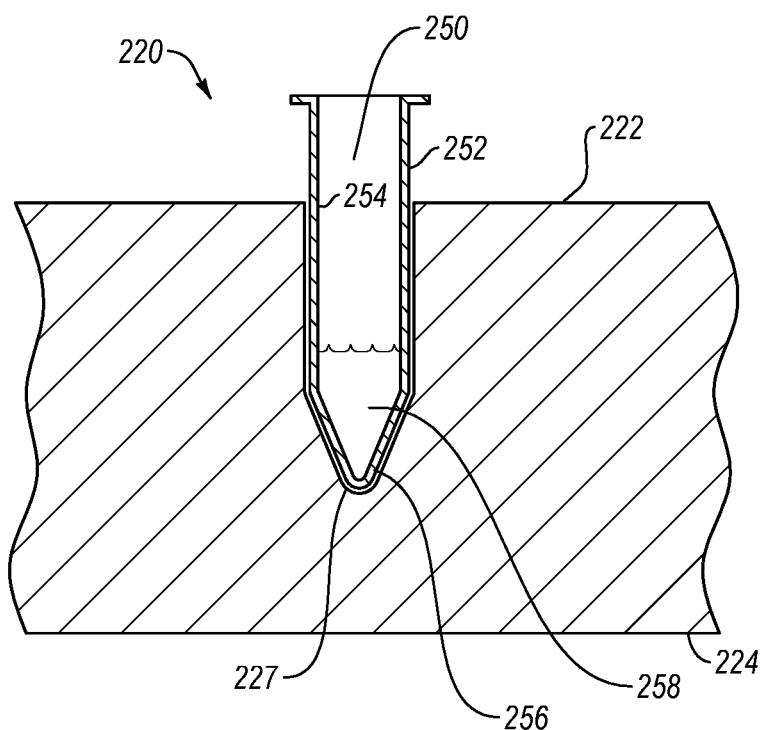
FIG. 2C illustrates a single sample receptacle of the sample block of FIG. 2A with a sample tube inserted therein.

Referring now to FIG. 2B, a cut-away view of a single recessed sample receptacle 225a is illustrated. The sample receptacle 225a shown in FIG. 2B is exemplary of the sample receptacles 225 of the sample block 220. The illustrated sample receptacle 225a extends from a top surface 222 of the sample block 220 towards a bottom surface 224 of the sample block 220. According to the present description, each of the bottoms 227 of the sample receptacles may define one of a plurality of points of interest to be observed/monitored by the optical system 200. FIG. 2C illustrates the sample tube 250 or a similar vessel that is configured to interface with the sample receptacle. The sample tube 250 includes an exterior surface 252, an interior surface 254, a top end 260, and a bottom end. According to the present description, each of the bottoms 256 of the sample tubes 250 may define one of a plurality of points of interest to be observed/monitored by the optical system 200. As shown in FIG. 2C, sample tube 250 is an individual sample tube that illustratively may be provided in an array. However, it is understood that sample tube 250 may be part of a strip tube or other configuration. In one embodiment, the recessed receptacles 225 of the sample block 220 may be configured to receive a multi-well well plate (e.g., a 96-well plate) similar to that shown in FIG. 1. However, the mirror 230 is positioned relative to the sample block 220 and the observation apparatus 240 such that the observation apparatus can substantially simultaneously see into the bottom of either the sample receptacles 225 or the recessed wells of a well plate.

In the illustrated embodiment, the observation apparatus 240 is positioned a predetermined distance 'd' from the sample block 220, with a path that is angled at the mirror 230. In the illustrated embodiment, 'd' includes a vertical and a horizontal component. In one embodiment the combined lengths of the vertical and horizontal components is about 15 inches. For example, for some points the vertical component may be about 4 inches and the horizontal component may be about 11 inches. In one aspect, one or more of the sample block 220 and the mirror 230 are configured such that ray lengths from a plurality of points of interest (e.g., the bottom of each of the sample receptacles 225) to the observation apparatus 240 are substantially equal. In the illustrated embodiment, the ray lengths may have a length that is substantially equal to the predetermined distance.

In the illustrated embodiment of FIG. 2A, the mirror 230 is a double curved mirror that is specially designed and positioned to enable the observation apparatus 240 to see into the bottom of all of the sample receptacles 225 or into the bottom of the wells of a multi-well well plate substantially simultaneously. At distance 'd', the observation apparatus 240 would not be able to see into the bottom of all of the sample receptacles 225 or into the bottom of the wells of a multi-well well plate substantially simultaneously without the mirror 230 or similar means described herein. Distance "d" is shorter than a distance between the bottom of the sample receptacles and the observation apparatus in a similar system wherein the observation apparatus is positioned in straight line from the sample receptacles, without intervening optical lenses.

Double curved mirrors like mirror 230 will be discussed in greater detail below in reference to FIGS. 3A-4D. Other curved components that may be included in an optical system like optical system 200 and that are configured to enable an observation apparatus 240 to substantially simultaneously monitor a plurality of points of interest will be also be discussed in greater detail below. For instance, in reference to FIGS. 5A-5C, a sample block having a compound curved surface will be discussed, and, in reference to FIGS. 6A-6C, a combination of a sample block having a single axis of curvature and a mirror having a single, complementary axis of curvature will be discussed.

Figure 3A:
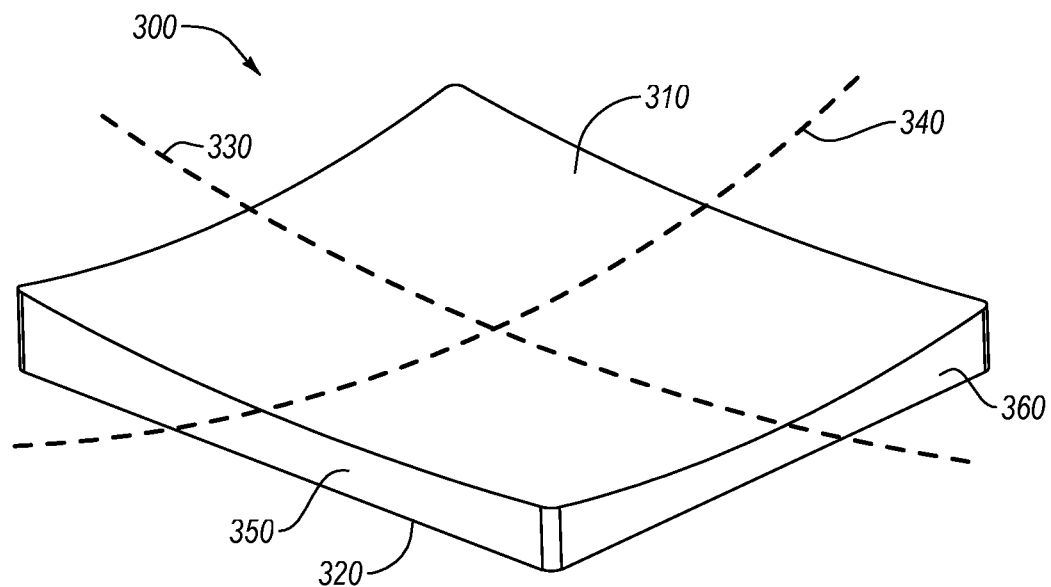
FIG. 3A illustrates an isometric view of a mirror having compound curvature.
Figure 3B:
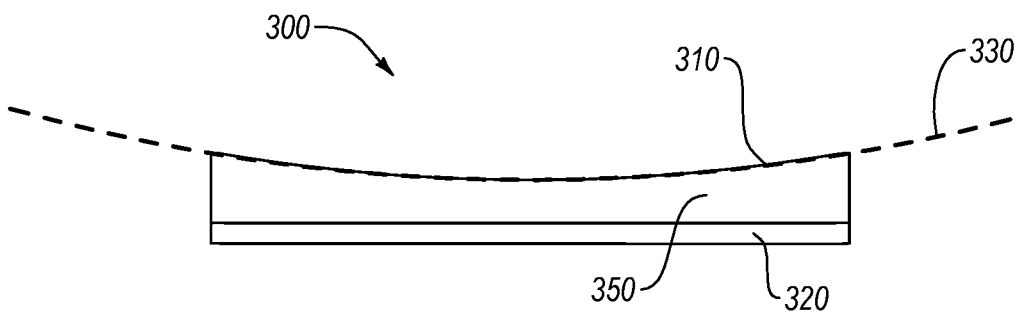
FIG. 3B illustrates a side elevation view of the mirror of FIG. 3A.
Figure 3C:
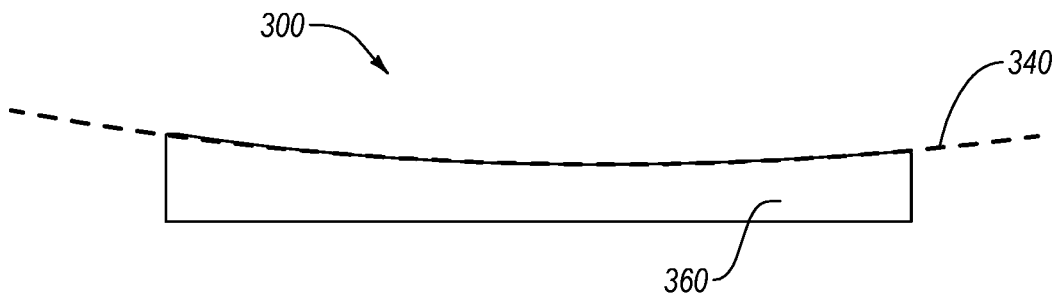
FIG. 3C illustrates another side elevation view of the mirror of FIG. 3A.
Figure 3D:
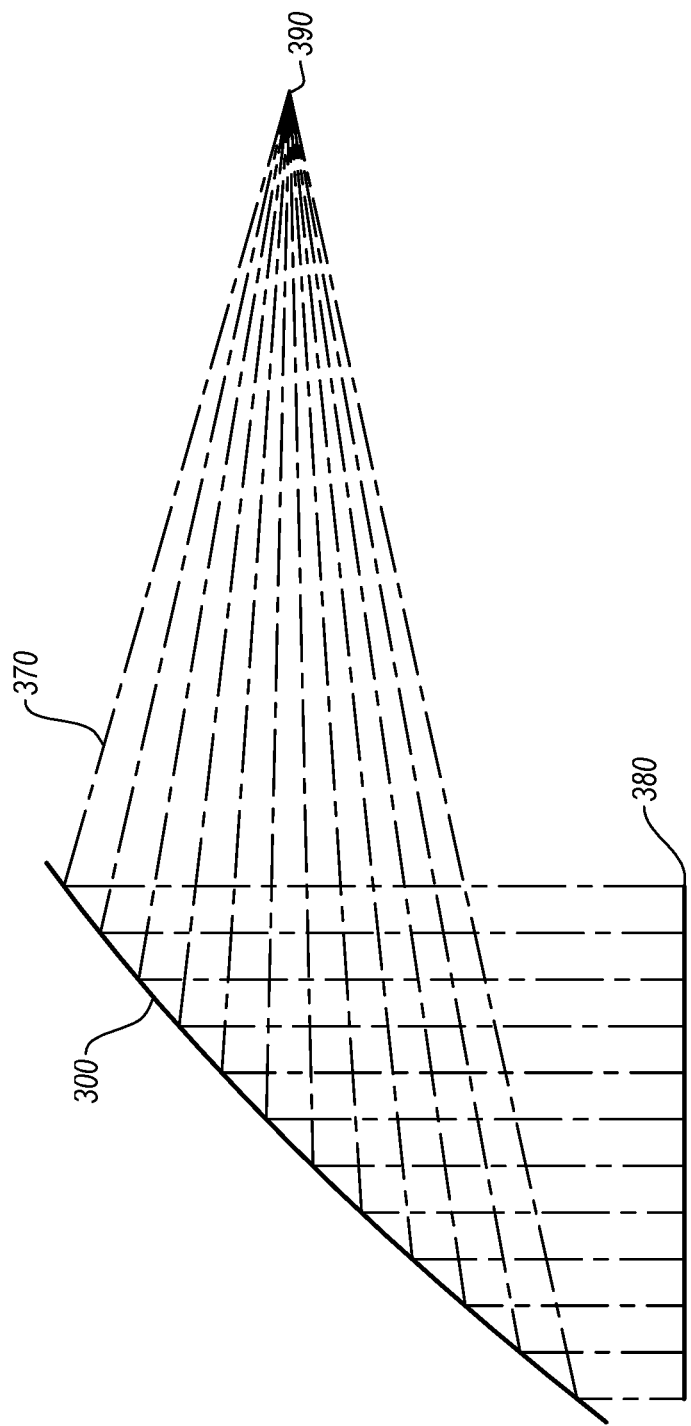
FIG. 3D illustrates a ray trace diagram for the mirror and sample block of FIG. 3A.

Referring now to FIGS. 3A-3D, several views of a mirror 300 having a compound curvature are shown. FIG. 3A illustrates and isometric view of the mirror 300; FIG. 3B illustrates a side elevation view of a first face 350 of the mirror 300; and FIG. 3C illustrates a side elevation view of a second face 360 of the mirror 300. FIG. 3D illustrates a ray trace diagram showing the light paths 370 from a plurality of points of interest 380 to a common viewing point 390.

The mirror 300 includes a top, reflective surface 310 and a bottom surface 320. The mirror 300 may be fabricated by any technique known in the art. In one example, the mirror 300 may be injection molded out of plastic, then coated in a low temperature coating process to produce the reflective surface 310.

In the illustrated embodiment, the top surface 310 is curved in two axes, which are labeled 330 and 340. Axes 330 and 340 are orthogonal to one another. The two axes of curvature 330 and 340 can also be seen in FIGS. 3B and 3C, respectively. FIG. 3B is a side elevation view of face 350, which shows face 350 along axis of curvature 330. FIG. 3C is a side elevation view of face 360, which shows axis of curvature 340. In one embodiment, the mirror 300 is curved as a dual curved bi-conic mirror. Curving the mirror in two planes allows for visualization of standard off the shelf disposable plates and strips. Using a standard flat sample block, every axial ray is traced vertically upward, bounced off the mirror, and angled directly into the center of an observation apparatus (e.g., a camera lens). This is schematically illustrated in FIG. 3D. In FIG. 3D, axial rays 370 form a plurality of points of interest 380 are directed to a common reference point at 390.

When the overall length of each ray 370 from the plurality of points of interest 380 to the common reference point 390 is constrained to be substantially the same length, the resulting mirror shape 300 may be described as a dual curved bi-conic shape. That is, if the mirror 300 were cut into a series of sections along a vertical or a horizontal axis, each of the section would be a conic section. However, the conic sections formed by vertical slices and the conic sections formed by orthogonal horizontal slices are not necessarily the same—i.e., the curvature in along axis 340 is not necessarily the same as the curvature along axis 330.

In one embodiment, the shape of the mirror 300 may be described as being aspherical with a so-called aspheric sag. An aspheric mirror may be defined as a mirror whose surface profiles are not portions of a sphere or cylinder. An aspheric mirror is a rotationally symmetric optic whose radius of curvature varies radially from its center. Perhaps the most unique geometric feature of an aspheric mirror is that the radius of curvature changes with distance from the optical axis, unlike a sphere, which has a constant radius. In one example, mirror 300 may be defined with the surface profile (sag) given by Equation 1:

$$Z = (s^2/r)/(1 + (1-(k+1)(s/r)^2)^{1/2}) + \text{Offset} \quad \text{Equation 1}$$

where Z=sag of surface parallel to the optical axis, k=conic constant, and $s^2 = (ax+b)^2 + (cy+d)^2$ Illustratively, the coefficients are:

k=−1 r=−1.1E+01 a=1 b=−1.1E+01 c=1 d=0

Offset=9.5

The following table shows how the actual conic surface generated depends on the magnitude and sign of the conic constant k.

TABLE 1

| Conic Constant | Conic Surface |
| --- | --- |
| k = 0 | Sphere |
| k > −1 | Ellipse |
| k = −1 | Parabola |
| k < −1 | Hyperbola |

Thus, in the illustrative embodiment wherein the shape of mirror 300 is determined by Equation 1 with the coefficients provided above, the curvatures 330 and 340 trace parabolas. However, other shapes may be possible.

In one aspect, constraining the shape of the mirror 300 so that the ray lengths from a set of points of interest to a common reference point (e.g., a common convergence point) are substantially equal in length has the effect of enabling an observation apparatus to see all the way to the bottom of each of the sample receptacles when, for example, the mirror 300 in incorporated into an optical system like that illustrated in FIG. 2. Images collected using mirror 300 shaped, for example, according to Equation 1 may be somewhat distorted (e.g., in a fan pattern), but there is no interference or eclipsing by the top of the sample wells. See, for example, FIG. 1 for an example of interference or eclipsing by the top of the sample wells. Moreover, the distortion using mirror 300 according to Equation 1 will be substantially the same from image to image, allowing the distortion to be corrected or equilibrated in data processing.

It is understood that other mirror shapes are within the scope of this disclosure, as long as the shape provides an image of the bottom of each sample vessel. For example, a properly shaped and positioned spheric mirror may be able to image all of the sample wells in a sample array without eclipsing. However, with such a mirror, it may be the case that the ray lengths from the points of interest to a common reference point will not necessarily be equal in length.

Figure 4A:
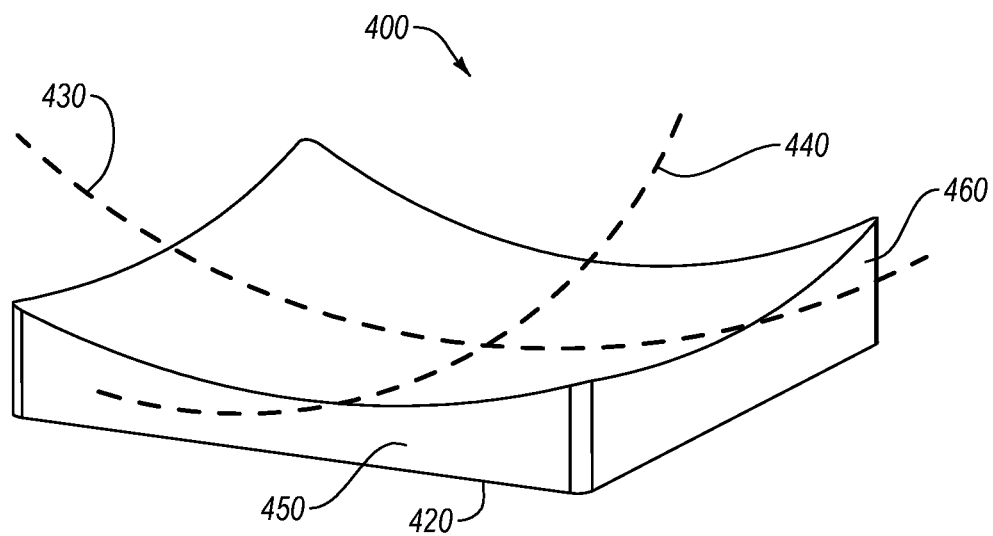
FIG. 4A illustrates an isometric view of another embodiment of a mirror having a compound curvature.
Figure 4B:
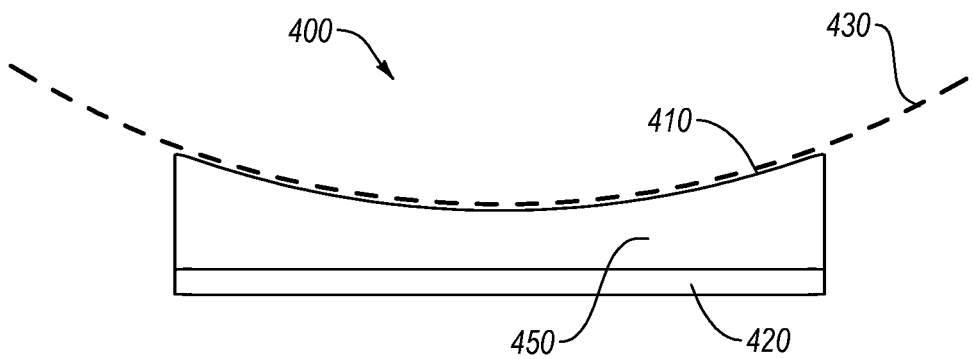
FIG. 4B illustrates a side elevation view of the mirror of FIG. 4A.
Figure 4C:
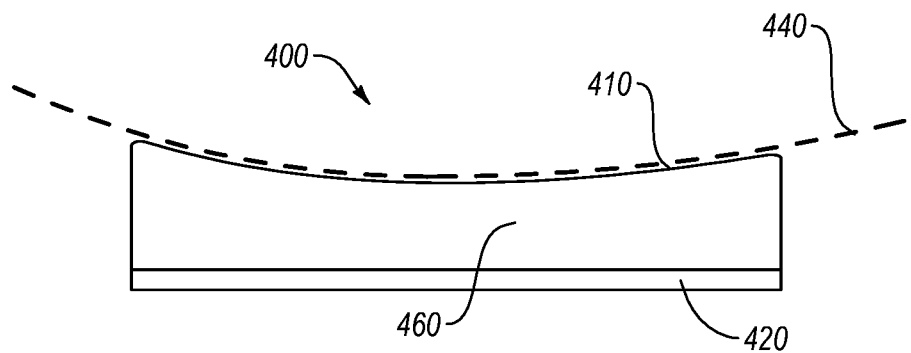
FIG. 4C illustrates another side elevation view of the mirror of FIG. 4A.

Referring now to FIGS. 4A-4D, an alternative embodiment of a double curved mirror 400. Mirror 400 is similar to mirror 300 in many respects except mirror 400 has greater degrees of curvature. The mirror 400 includes a top, reflective surface 410 and a bottom surface 420. The top surface 410 is curved in two axes, which are labeled 430 and 440. Axes 430 and 440 are orthogonal to one another. The two axes of curvature 430 and 440 can also be seen in FIGS. 4B and 4C. FIG. 4B is a side elevation view of face 450, which shows face 450 along axis of curvature 430. FIG. 4C is a side elevation view of face 460, which shows axis of curvature 440.

Figure 4D:
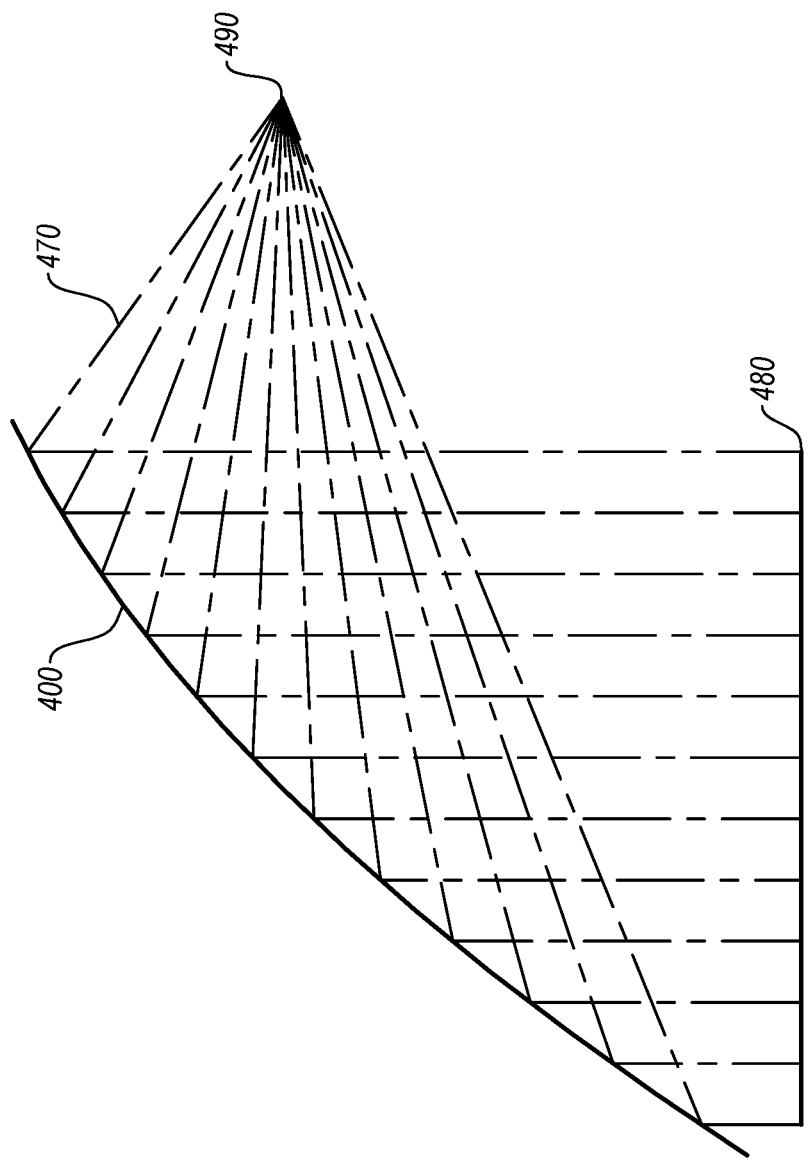
FIG. 4D illustrates a ray trace diagram for the mirror of FIG. 4A.

The effect of curving the mirror with shorter radii of curvature relative to mirror 300 is schematically illustrated in FIG. 4D. When the overall length of each ray 470 from the plurality of points of interest 480 to the common reference point 490 is constrained to be substantially the same length, the resulting mirror shape 400 is a dual curved bi-conic mirror. This has the effect of enabling an observation apparatus to see all the way to the bottom of each of the sample receptacles when, for example, the mirror 400 in incorporated into an optical system like that illustrated in FIG. 2 without the need for focusing lens(es) or mirror(s). Images collected using mirror 400 are distorted in a fan pattern, but there is no interference or eclipsing by the top of the sample wells (see, e.g., FIG. 1).

Figure 5A:
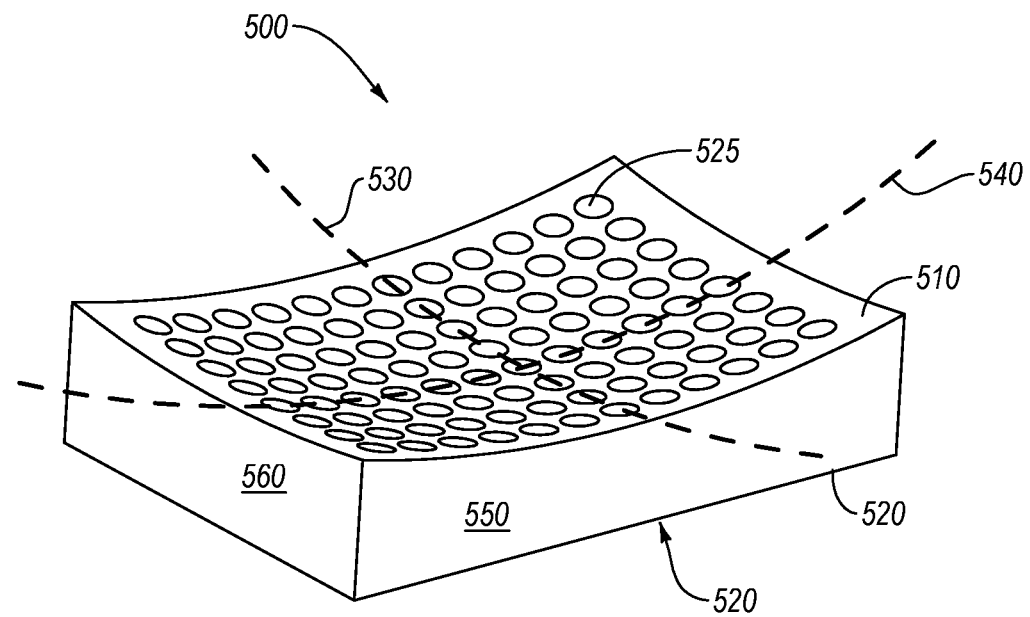
FIG. 5A illustrates an isometric view of a sample block having a compound curved surface that may be used in an optical system for substantially simultaneous observation of an array of points of interest.
Figure 5B:
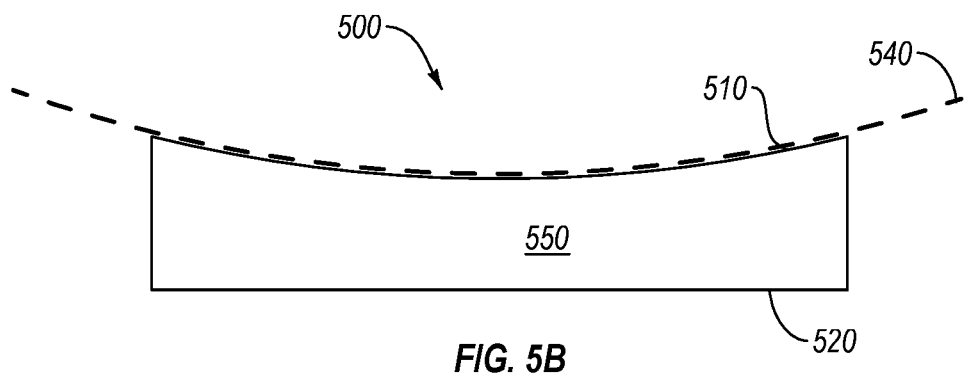
FIG. 5B illustrates a side elevation view of the sample block of FIG. 5A.
Figure 5C:
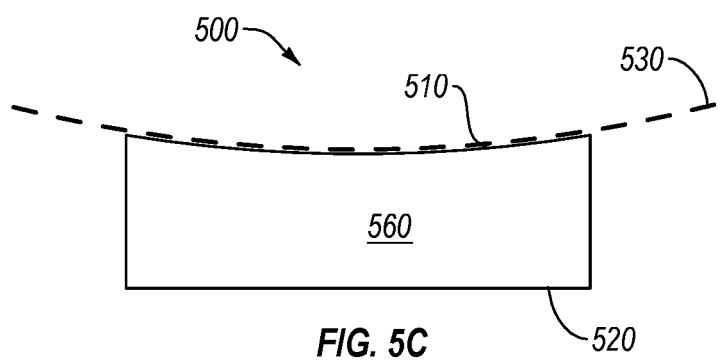
FIG. 5C illustrates another side elevation view of the sample block of FIG. 5A.

Referring now to FIGS. 5A-5C, several views of a sample block 500 having a compound curvature are shown. FIG. 5A illustrates an isometric view of the sample block 500; FIG. 5B illustrates a side elevation view of a first face 550 of the sample block 500; and FIG. 5C illustrates a side elevation view of a second face 560 of the sample block 500. Sample block 500 can, in some embodiments, be used in an optical system as an alternative to the double curved mirrors illustrated in FIG. 3A-3D or 4A-4D.

The sample block 500 includes a top surface 510, a bottom surface 520, and a number (e.g., 96) of sample receptacles 525. The sample receptacles 525 may be configured for receiving liquid samples directly, or the sample receptacles 525 may be configured for receiving separate samples tubes or a sample plate.

In one embodiment, the sample block 500 may be fabricated from a material selected from metals such as aluminum, copper, and silver, ceramics, plastic, and the like. In one embodiment, the sample block 500 is included a heat block apparatus in a PCR instrument. In such a case, the sample block may preferably be fabricated from a highly thermally conductive material such as, but not limited to, aluminum, copper, or silver.

In the illustrated embodiment, the top surface 510 includes two axes of curvature, which are labeled 530 and 540. Axes 530 and 540 are orthogonal to one another and they may have the same or different radii. The two axes of curvature 530 and 540 can also be seen in FIGS. 5B and 5C. FIG. 5B is a side elevation view of face 550, which shows axis of curvature 530. FIG. 5C is a side elevation view of face 560, which shows axis of curvature 540. In one embodiment, curvatures 530 and 540 have the same radii, and the sample block 500 is curved as a section of a sphere. In one embodiment, the sphere has a radius equal or nearly equal to a distance from the top surface to an observation apparatus. For example, if the observation apparatus is a camera, then the radius of the sphere that defines the shape of the sample block 500 may be equal to the distance from the top surface 510 of the sample block 500 to the front of a camera lens.

In the embodiment illustrated in FIGS. 5A-5C, an observation apparatus similar to that shown in FIG. 2A is able to see to the bottom 527 or each of the sample receptacles 525 because the sample receptacles 525 are arranged such that they are normal to the curvature of the top surface 510 of the sample block. This has the effect of angling each sample receptacle 525 slightly so that the bottom 527 of each sample receptacle points directly toward an observation apparatus in order to overcome the parallax of light (see, e.g., FIG. 1). This has the effect of enabling an observation apparatus to see all the way to the bottom 527 of each of the sample receptacles 525 without the need for any focusing lens(es) or mirror(s). A dual curved sample block 500 thus allows the observation apparatus (e.g., a camera) to image directly into the bottom 527 of every sample receptacle 525 without any loss of signal due to eclipsing.

Figure 6A:
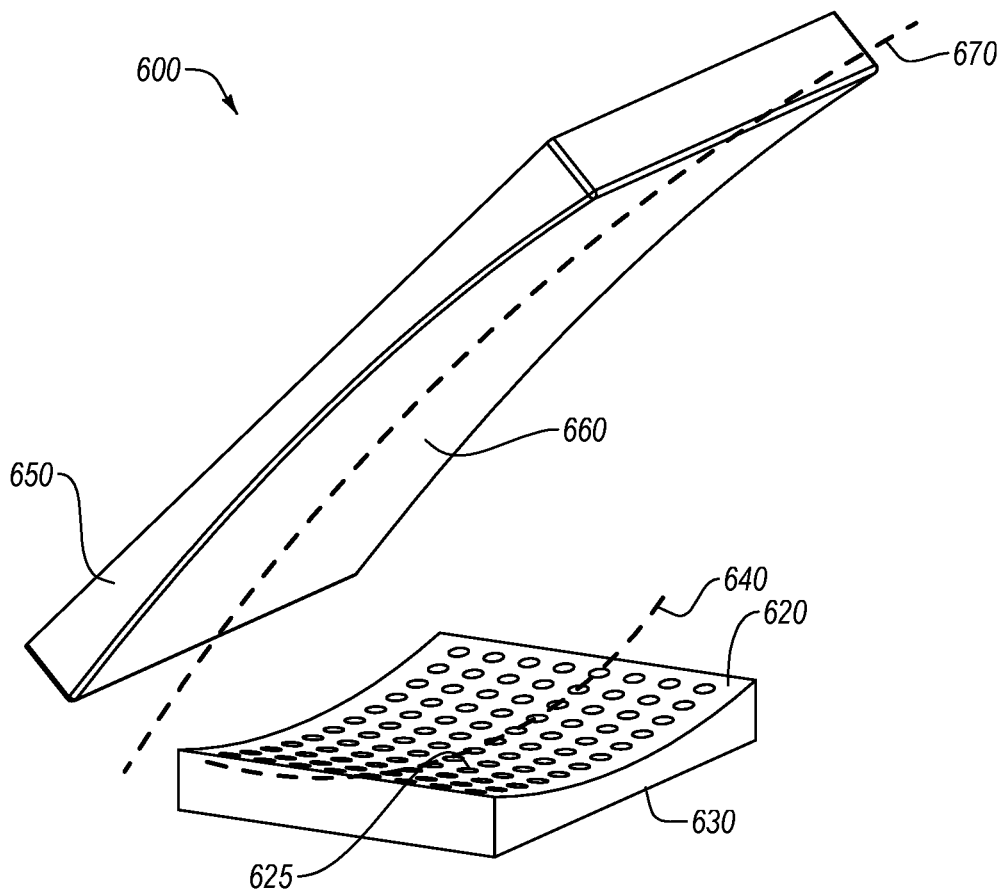
FIG. 6A illustrates an optical system for substantially simultaneous observation of an array of points of interest that includes an isometric view of a sample block having a single axis of curvature in relation to a mirror having a single, orthogonal axis of curvature.
Figure 6B:
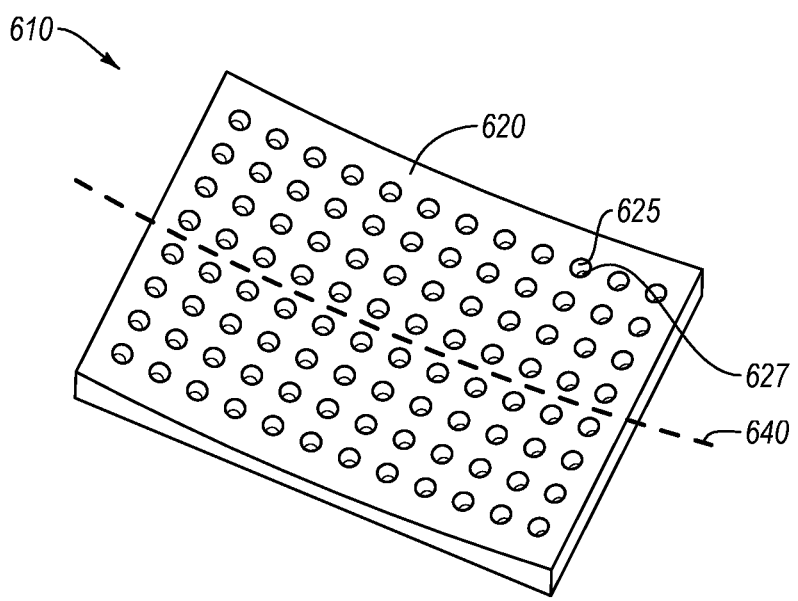
FIG. 6B illustrates an isometric view of the sample block of FIG. 6A.
Figure 6C:
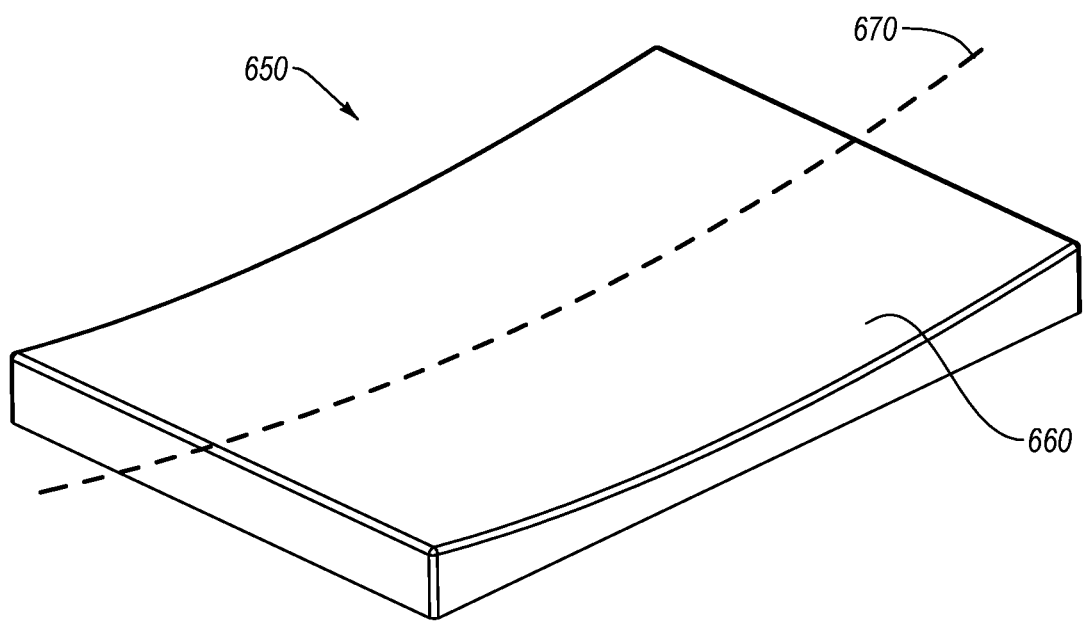
FIG. 6C illustrates an isometric view of the mirror of FIG. 6A.

Referring now to FIGS. 6A-6C, embodiment of an optical system 600 is illustrated. The optical system includes a single curved sample block 610 and a complementary single curved mirror 650. As with the double curved sample block, optical system 600 can be used as an alternative to the curved mirrors described in FIGS. 3A-3D and 4A-4D for substantially simultaneous observation of an array of points of interest.

The sample block 610 includes a top surface 620, a bottom surface 630, and a plurality of sample receptacles 625. The sample receptacles 625 extend from the top surface 620 toward the bottom surface 630. The sample receptacles 625 are arranged such that they are normal to the curvature of the top surface 620 of the sample block 610. The single curved sample block 610 resembles a standard flat sample block that has been rolled slightly in the same radius as the distance to the center of a common observation point. This has the effect of angling each sample receptacle 625 slightly along curvature 640 so that the bottom 627 of each sample receptacle points directly toward an observation apparatus in order to overcome the parallax of light in one plane. In the flat plane, there will still be some interference in the peripheral samples due to the top edge of the well.

However, when the single curved sample block 610 with curvature 640 is paired with a mirror 650 of curvature 670 that is illustratively parabolic placed above the single curved sample block 610, the combination allows a camera or a similar device to see directly into the bottom 627 of every sample receptacle 625 of the sample block 610 (or into the bottom of a well plate placed in the sample block 610). One plane of correction is accomplished by the curve of the sample block 610, and the other is accomplished by the mirror 650.

II. Thermocycling Systems

Reference will now be made to exemplary embodiments of thermocycling systems that are configured for subjecting a plurality of biological samples contained within a corresponding plurality of sample containers to thermal cycling. The thermocycling systems include an optical system that is capable of substantially simultaneous monitoring of fluorescence in each of a plurality of biological samples. However, these exemplary embodiments are not intended to limit the disclosure. On the contrary, the disclosure is intended to cover alternatives, modifications, and equivalents.

Figure 7:
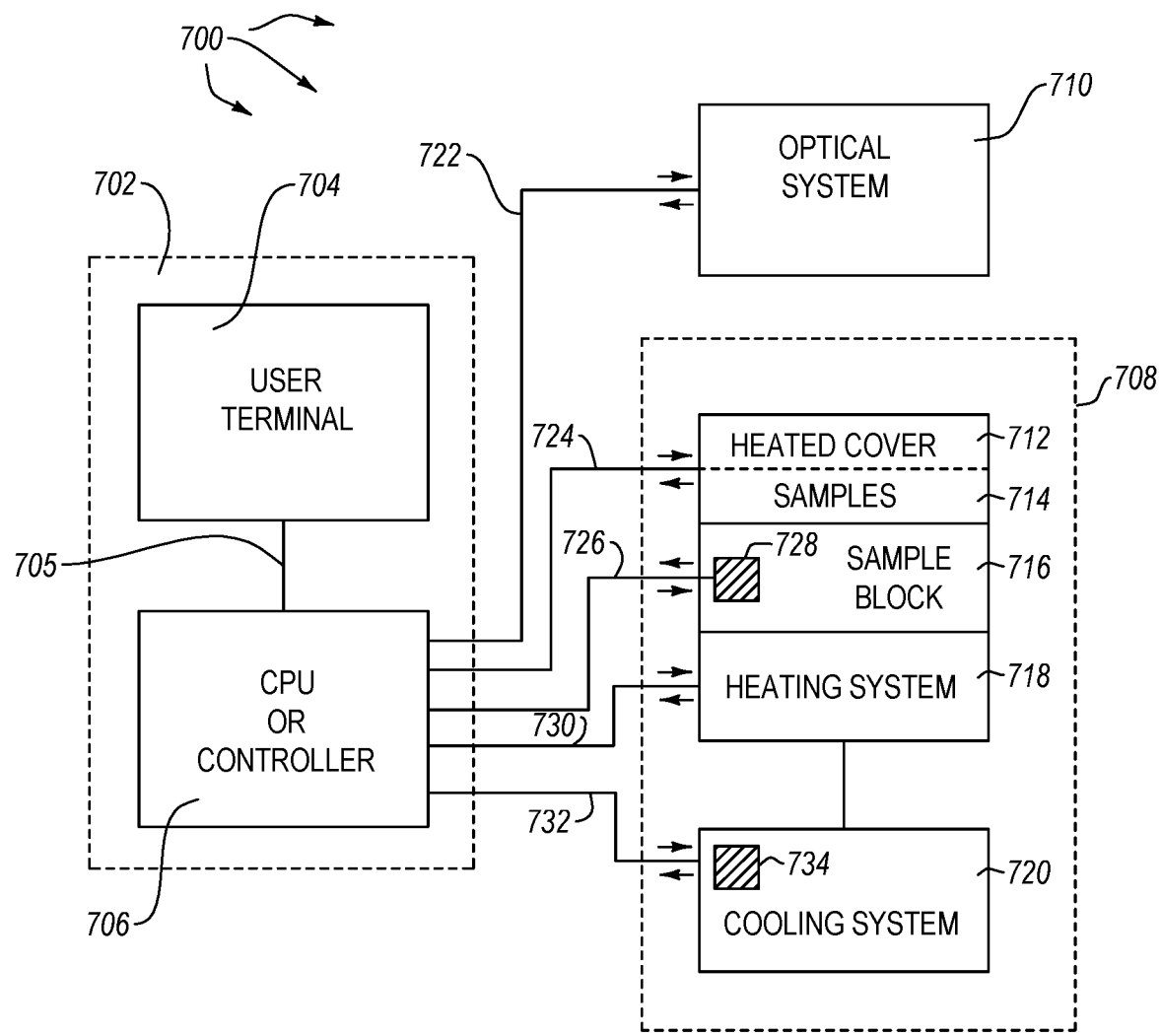
FIG. 7 is a block diagram of an exemplary embodiment of a thermal cycling system in accordance with aspects of the disclosure.

Referring to FIG. 7, a block diagram of an apparatus 700 that includes control systems 702, a thermocycling system 708, and an optical system 710 according to the exemplary aspects of the disclosure is shown. The optical system 710 defines an optical path that is operatively associated with the thermocycling system 708. In an embodiment, the optical system 710 includes a sample block (e.g., sample block 716). The sample block includes a top surface and a plurality of sample wells defining a plurality of recessed bottom surfaces that may define a first plurality of points of interest. Samples may be placed directly in the sample block or they may be placed in sample tubes that are configured to be interfaced with the sample block.

The optical system 710 further includes one or more elements that collectively define one or more curved surfaces that are disposed in the optical path, wherein the one or more curved surfaces collectively define a ray length from each point of interest to a common reference point whose distance from the points of interest is less than or equal to a predetermined distance, and wherein the ray lengths are substantially the same and the rays may be substantially parallel to each other for at least a portion of their path. As discussed in greater detail elsewhere herein, the one or more curved surfaces that are disposed in the optical path may include a double curved mirror, a double curved sample block, or a combination of a single curved sample block and a complementary single curved mirror.

In one embodiment, the optical system may further include a camera and an illumination light source that are each in a fixed position in the optical path relative to the sample block and the one or more curved surfaces. The sample block, the illumination light source, and the one or more curved surfaces are positioned and arranged relative to one another such that the first plurality of points of interest can be illuminated substantially simultaneously by the illumination light source and observed substantially simultaneously from a common reference point by the camera.

With further reference to FIG. 7, samples 714, illustratively including nucleic acids to be amplified, are placed in a temperature-controlled sample block 716 and are covered by a heated cover 712. Alternatively, the samples 714 may be covered by an oil overlay, which may prevent evaporation of the samples and may replace the heated cover 712. Samples 708 can be held in a sample holder (e.g., in a multi-well well plate, tube strips, or individual sample tubes, etc.) configured to be seated in the sample block 716 and may be thermally isolated from the ambient air by the heated cover 712 or an overlay oil. The sample block 716 may be a metal block constructed, for example, from a thermally conductive metal such as copper or aluminum. As discussed elsewhere herein, the sample block 716 may have a number of planar or curved configurations.

A user may supply data defining time and temperature parameters (e.g., time-temperature profiles) of the desired PCR protocol via a terminal 704. For example, the terminal 704 may include an external computing device that includes a keyboard, a display, and one or more control, memory, or programming modules that allow programming and control of thermocycling parameters, or may be integral to the apparatus. The user terminal 704 is coupled via a data bus 705 to a controller 706 (sometimes referred to as a central processing unit or CPU). The controller 706 can include memory that stores a desired control program, data defining a desired PCR protocol, and certain calibration constants. Based on the control program, the controller 706 may control temperature cycling of the sample block 716 and/or holders containing the samples 714 and implements a user interface that provides certain displays to the user and receives data entered by the user via the user terminal 704. Likewise, the controller 706 can include memory that stores a desired program for controlling or managing collection of fluorescence data from the sample via the optical system 710. Based on the control program, the controller 706 may control optical system parameters such as timing of optical data collection, wavelength data, and the like and implement a user interface that provides certain displays to the user and receives data entered by the user via the user terminal 704. It should be appreciated that the controller 706 and associated peripheral electronics to control the various heaters, optical systems 710, and other electro-mechanical systems of the thermal cycling system 708 and read various sensors can include any general purpose computer such as, for example, a suitably programmed personal computer or microcomputer.

The controller 706 can include appropriate electronics to sense the temperature of the heated cover 712 and control electric resistance heaters therein to maintain the cover 712 at a predetermined temperature. Sensing of the temperature of the heated cover 712 and control of the resistance heaters therein is accomplished via a temperature sensor (not shown) and a data bus 724.

A cooling system 720 can provide precise temperature control of the samples 714. According to some aspects, the cooling system 720 can be operated to achieve fast, efficient, and/or uniform temperature control of the samples 714. According to some aspects, the cooling system 720 can be operated to quickly and/or efficiently achieve a desired temperature gradient between various samples. The cooling system 720 may, for example, be configured to reduce the temperature of the samples 714 from a high temperature denaturation incubation to lower temperature annealing and extension incubation temperatures. For example, the cooling system 720 may lower the temperature of the sample block 716 or may act to directly lower the temperature of holders containing the samples 714.

A heating system 718 can be controlled by the controller 706 via a data bus 730 to rapidly raise the temperature of the sample block 716 and/or the sample holders to higher incubation temperatures from lower incubation temperatures. The heating system 718 also may correct temperature errors in the upward direction during temperature tracking and control during incubations.

The heating system 718 may include, but is not limited to, film heaters, resistive heaters, heated air, infrared heating, convective heating, inductive heating (e.g. coiled wire), peltier based thermoelectric heating, and other heating mechanisms known to those skilled in the art. According to various exemplary embodiments, the cooling system and the heating system may be a single system configured to both increase and decrease the temperature of the block 712 and/or of the sample holders directly.

In the exemplary embodiment of FIG. 7, the controller 706 controls the temperature of the sample block 716 by sensing the temperature of the sample block 716 via a temperature sensor 728 and the data bus 726 and by sensing the temperature of the cooling system 720 via bus 732 and a temperature sensor 734 in the cooling system 720. By way of example only, the temperature of the cooling system 720 may be sensed, although other temperatures associated with the cooling system may also be sensed.

Further discussion of thermocycling systems that may be used in the devices and apparatuses disclosed herein can be found in PCT/US2011/063005 (published as WO 2012/075360), the entirety of which is incorporated herein by reference. Discussion of fluorescent monitoring of samples and, in particular, PCR samples can be found in U.S. Pat. No. 7,670,832, the entirety of which is incorporated herein by reference.

Figure 8A:
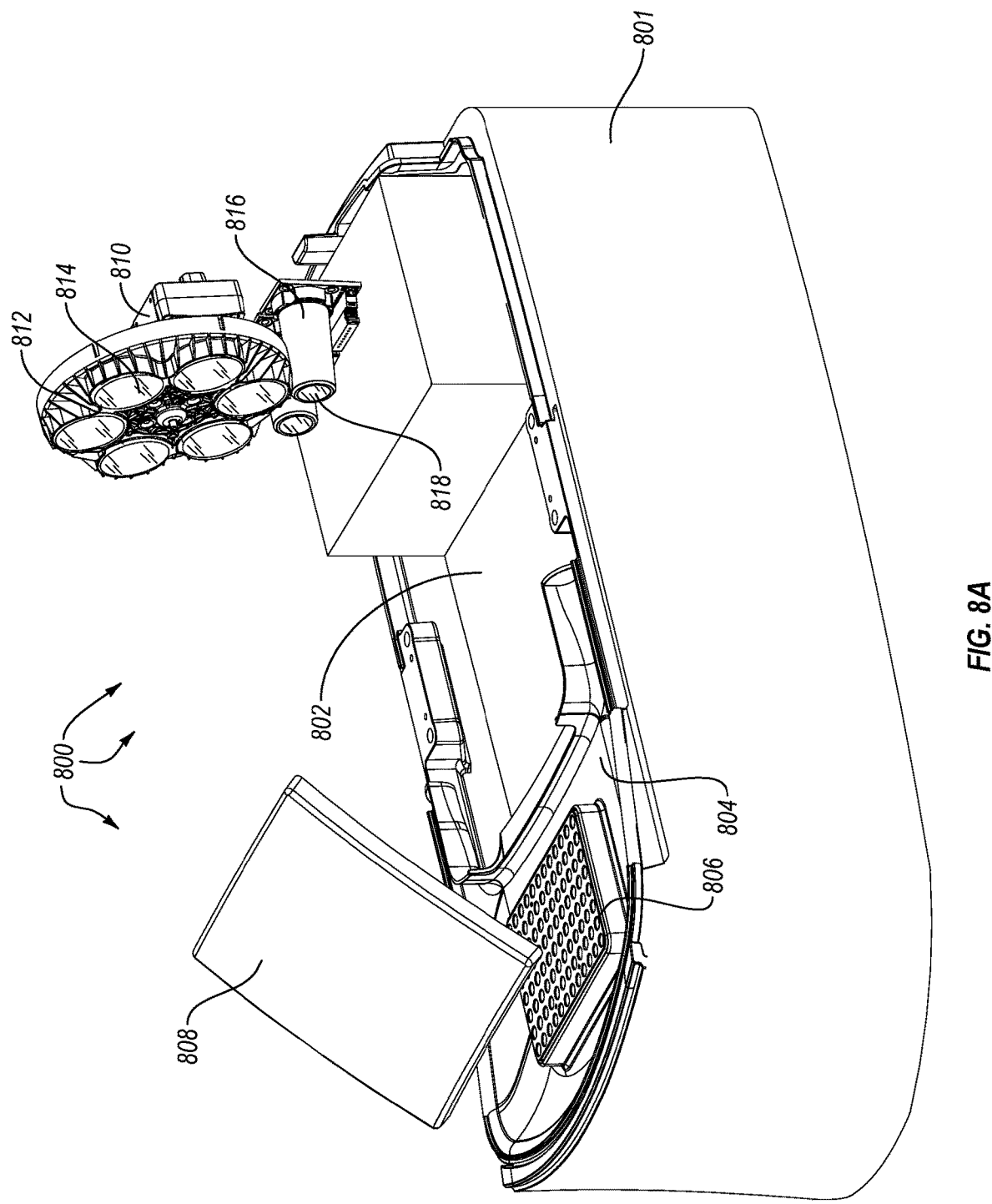
FIG. 8A illustrates an isometric view of a thermal cycling system that includes an optical system that may be used for substantially simultaneous observation of an array of samples being subjected to thermal cycling.
Figure 8B:
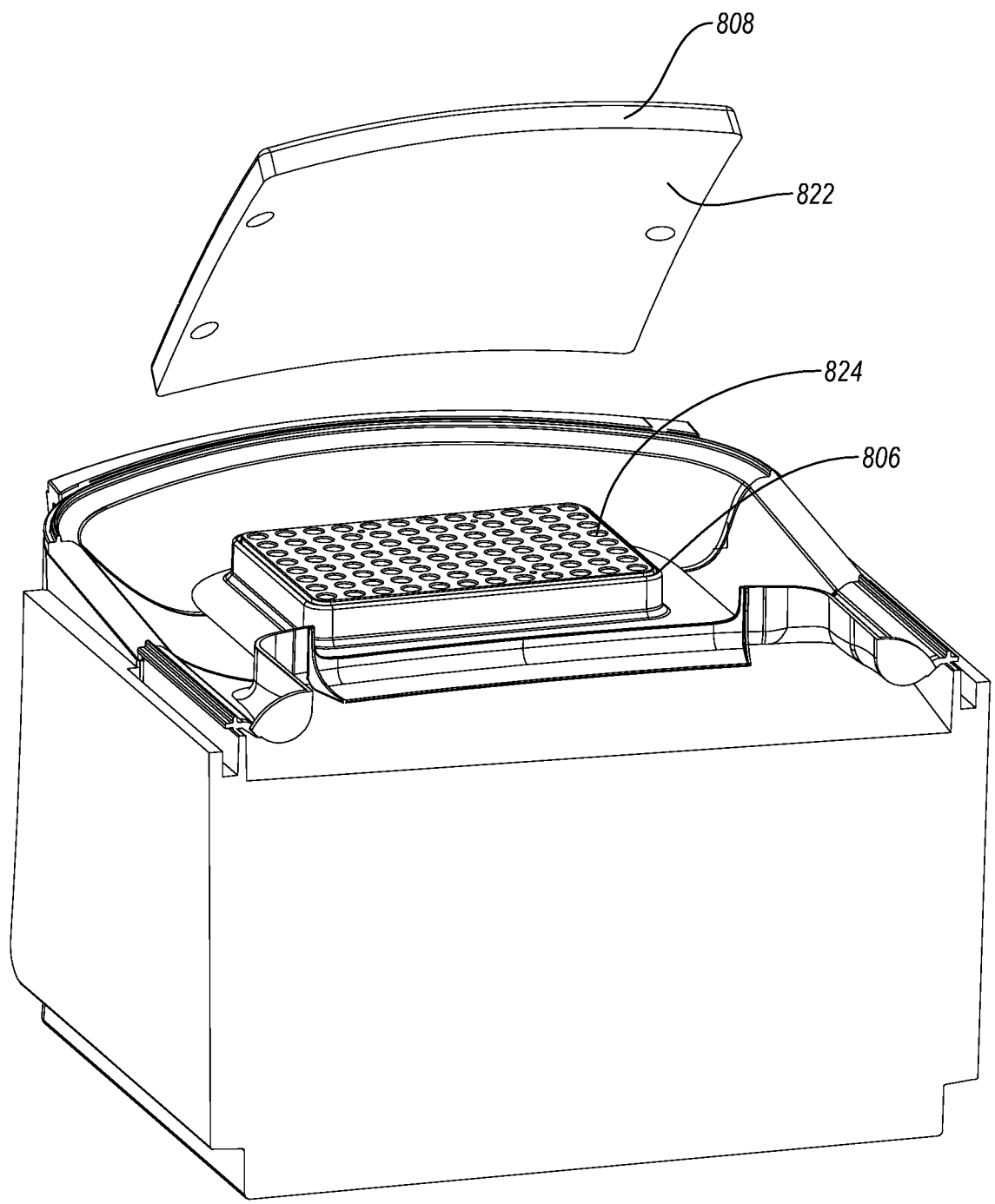
FIG. 8B illustrates a partial cut-away view on the thermal cycling system of FIG. 8A.

Referring now to FIGS. 8A and 8B, a specific embodiment of a PCR instrument 800 that includes an optical system is illustrated. The PCR instrument 800 includes a housing 801 that may include control systems 802 and components of a thermocycling system 804 (e.g., heating systems and cooling systems). The housing 801 may also include a substantially light-tight top cover (not shown) that is configured to fit onto the housing 801. The PCR instrument 800 may also include an internal or external computing device (not shown) that is operatively coupled to at least one of the control systems 802 or the thermocycling system 804. Likewise, the external computing device may be connected to the optical system.

The optical system of the PCR instrument 800 includes a substantially planar sample block 806, a mirror 808, a camera 810, and an illumination light source 816. In the illustrated embodiment, the mirror 808 is similar to the double curved mirror 300 shown in FIGS. 3A-3D. One will appreciate, however, that the optical system could include, for example, the double curved sample block 500 shown in FIG. 5A-5D or the combination of the single curved sample block 610 and the single curved mirror 650 shown in FIGS. 6A-6C.

Referring to FIG. 8B, the sample block 806 includes a number of sample receptacles 824 that are configured to receive a number of sample tubes or a 96-well plate (not shown). The PCR instrument 800 may include a heated cover (not shown) that is positioned and configured to fit over the sample block 806 and the sample tubes positioned therein. The mirror 808 includes a reflective surface 822.

As discussed in greater detail elsewhere herein, the reflective surface 822 of the mirror 808 is curved and positioned relative to the sample block 806 in order to direct light from the illumination light source 816 into each of the sample tubes in the sample receptacles 824 and to substantially simultaneously direct a resultant fluorescent signal from the each of the sample tubes to the camera 810. In the illustrated embodiment, the illumination light source 816 further includes filters 818 and 820 that can be used to select various excitation wavelengths for excitation of fluorescence form various dyes. For example, the filters 818 and 820 can be used to select excitation wavelengths selected from, but not limited to, 470, 530, 586, and 630 nm. Likewise, the camera 810 may be equipped with filter wheel 812 and filters 814 that can be used to filter various fluorescent signals, illustratively at 510, 555, 620, 640, 665, and 710 nm. For example, an experiment may include the use of multiple dyes that fluoresce simultaneously. Filters 812 and 814 may be used, for example, to distinguish two or more fluors from each other that are emitting simultaneously in the sample(s).

In one example, the illumination light source 816 may include a multichromatic light source and the filters 818 and 820 may be so-called dual band filters. For example, the illumination light source 816 may include one or more lamps that are each equipped with several LEDs having at least two different colors, and focusing optics that are capable of focusing and spreading light from the LEDs so that they provide an output that is illustratively substantially gaussian. The dual band filters 818 and 820 may each be equipped such that they can pass one emission band from the different LEDs. For example, filter 818 may be capable of passing bands of light centered around 470 and 586 nm and filter 820 may be capable of passing bands of light centered around 530 and 630 nm. Using such an illumination light source 816 and filters 818 and 820, the system 800 may be configured to produce up to four different excitation wavelengths from only two lamps. In other embodiments, filters 818 and 820 may be, for example, triple band pass filters illumination light source 816 may include, for example, two lamps that are each capable of producing three discrete light color ranges. Such a system may be configured to produce up to six different excitation wavelengths from only two lamps.

In the illustrated embodiment, the PCR system 800 is designed such that the mirror 808, the sample block 806, and the camera 810 are at roughly right angles to one another, but this is not a requirement. Other angles are possible.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
  a sample block positioned at a first end of a body, the sample block having a plurality of recessed receptacles, each recessed receptacle sized and shaped to receive a sample container,
  an observation element positioned at a second end of the body, the observation element having a light source and a camera, the light source positioned to transmit light toward the first end of the body,
  a reflective element positioned above the sample block at the first end of the body, the reflective element having a single reflective surface formed as a non-apex portion of a paraboloid, wherein the light source is positioned relative to the reflective element such that the reflective element directs light received from the light source simultaneously to each sample container and reflects an image of each sample container simultaneously to the observation element, wherein the reflected image of each sample container is distorted to form a fan shaped image, and
  a computer programmed to communicate with the observation element and to process the distorted image such that the distorted image is corrected to yield an undistorted image.

2. The apparatus of claim 1, further comprising a thermocycler.

3. The apparatus of claim 1, wherein the light source further includes focusing optics configured to focus and spread light to the reflective element.

4. The apparatus of claim 1, wherein the light source includes at least two lamps configured to produce at least six different excitation wavelengths.

5. The apparatus of claim 1, wherein the reflective element directs a fluorescent signal emitted from a sample within the sample container to the observation element, and the computer is programmed to process the fluorescent signal.

6. The apparatus of claim 1, wherein the sample block includes a multi-well plate having at least 96 sample wells.

7. The apparatus of claim 1, wherein the light source includes a bandpass filter configured to pass at least to two different bands of light from the light source to excite two or more fluorophores within the sample container to emit a fluorescent signal.

8. The apparatus of claim 1, wherein the camera includes one or more filters configured to pass fluorescent signals emitted from a sample within the sample container, each fluorescent signal being in a range of 1 to 4 different wavelengths.

9. The apparatus of claim 1, wherein the light source includes at least one filter selected from the group consisting of a 510 nm filter, a 555 nm filter, a 620 nm filter, and a 710 nm filter.

10. The apparatus of claim 1, wherein the camera includes at least one filter selected from the group consisting of a 510 nm filter, a 555 nm filter, a 620 nm filter, and a 710 nm filter.

11. A system for real-time monitoring of a biological sample comprising:
  a thermocycler including a sample block positioned at a first end, the sample block comprising a plurality of recessed receptacles, each recessed receptacle sized and shaped to receive a sample container,
  an observation element positioned at a second end opposite the first end, the observation element having a light source and a camera, the light source positioned to transmit light toward the first end,
  a reflective element positioned above the sample block and at the first end, the reflective element having a single reflective surface formed as a non-apex portion of a paraboloid, wherein the light source is positioned relative to the reflective element such that the reflective element directs light received from the light source simultaneously to each sample container and reflects an image of each sample container simultaneously to the observation element, wherein the reflected image of each sample container is distorted to form a fan shaped image, and a computer programmed to communicate with the observation element and to process the distorted image such that the distorted image is corrected to yield an undistorted image.

12. The system of claim 11, wherein the light source further includes focusing optics configured to focus and spread light to the reflective element.

13. The system of claim 11, wherein the light source includes at least two lamps configured to produce at least six different excitation wavelengths.

14. The system of claim 11, wherein the reflective element directs a fluorescent signal emitted from a sample within the sample container to the observation element, and the computer is programmed to process the fluorescent signal.

15. The system of claim 11, wherein the sample block includes a multi-well plate having at least 96 sample wells.

16. The system of claim 11, wherein the light source includes a bandpass filter configured to pass at least to two different bands of light from the light source to excite two or more fluorophores within the sample container to emit a fluorescent signal.

17. The system of claim 11, wherein the camera includes one or more filters configured to pass fluorescent signals emitted from a sample within the sample container, each fluorescent signal being in a range of 1 to 4 different wavelengths.

18. The system of claim 11, wherein the light source includes at least one filter selected from the group consisting of a 510 nm filter, a 555 nm filter, a 620 nm filter, and a 710 nm filter.

19. The system of claim 11, wherein the camera includes at least one filter selected from the group consisting of a 510 nm filter, a 555 nm filter, a 620 nm filter, and a 710 nm filter.

* * * * *